US012025150B2

(12) United States Patent
Milojevic

(10) Patent No.: US 12,025,150 B2
(45) Date of Patent: Jul. 2, 2024

(54) MULTISTAGE PUMP

(71) Applicant: Sulzer Management AG, Winterthur (CH)

(72) Inventor: Steve Milojevic, Beaverton, OR (US)

(73) Assignee: SULZER MANAGEMENT AG, Winterthur (CH)

(*) Notice: Subject to any disclaimer, the term of this patent is extended or adjusted under 35 U.S.C. 154(b) by 98 days.

(21) Appl. No.: 16/780,280

(22) Filed: Feb. 3, 2020

(65) Prior Publication Data

US 2021/0156394 A1 May 27, 2021

Related U.S. Application Data

(60) Provisional application No. 62/941,370, filed on Nov. 27, 2019.

(51) Int. Cl.
*F04D 29/42* (2006.01)
*F04D 1/06* (2006.01)
(Continued)

(52) U.S. Cl.
CPC ............... *F04D 29/42* (2013.01); *F04D 1/06* (2013.01); *F04D 29/445* (2013.01); *F15D 1/04* (2013.01);
(Continued)

(58) Field of Classification Search
CPC . F04D 1/06; F04D 29/42; F04D 29/44; F04D 29/445; F04D 29/041;
(Continued)

(56) References Cited

U.S. PATENT DOCUMENTS 1,163,809 A * 12/1915 Chapman et al. ........ F04D 1/06 415/100
2,281,650 A * 5/1942 Wislicenus ............. F22D 11/00 415/113

(Continued)

FOREIGN PATENT DOCUMENTS

CN 201433903 Y 3/2010
CN 105626543 A * 6/2016

(Continued)

OTHER PUBLICATIONS

JP-2015190320-A Machine Translation. Accessed EPO website Nov. 24, 2021. (Year: 2021).*

*Primary Examiner* — J. Todd Newton
*Assistant Examiner* — Cameron A Corday
(74) *Attorney, Agent, or Firm* — GLOBAL IP COUNSELORS, LLP

(57) ABSTRACT

A multistage pump includes a pump casing, a shaft, a first impeller, a second impeller, and a pipe. The shaft is rotatably disposed within the pump casing and has a longitudinal axis. The first impeller is disposed within the casing at a first position along the shaft. The second impeller is disposed within the casing at a second position and along the shaft. The pipe is detachably attached to the pump casing, and has an inlet and an outlet, the inlet disposed at the discharge of the first impeller and the outlet disposed at an eye of the second impeller, such that discharge from the first impeller can be conveyed to the eye of the second impeller.

18 Claims, 13 Drawing Sheets

(51) Int. Cl.
*F04D 29/44* (2006.01)
*F15D 1/04* (2006.01)

(52) U.S. Cl.
CPC ....... *F05B 2240/14* (2013.01); *F05B 2260/60* (2013.01)

(58) Field of Classification Search
CPC .... F04D 29/2266; F04D 29/54; F04D 29/541; F04D 29/545; F04D 29/548
See application file for complete search history.

(56) References Cited

U.S. PATENT DOCUMENTS

| | | | | | |
|---|---|---|---|---|---|
| 2,339,186 | A * | 1/1944 | Noble | F04D 1/06 415/111 |
| 4,715,778 | A * | 12/1987 | Katayama | F04D 29/0516 415/199.1 |
| 4,893,986 | A | 1/1990 | Catterfeld et al. | |
| 2010/0014963 | A1 * | 1/2010 | Hirschberger | F04D 29/448 415/203 |

FOREIGN PATENT DOCUMENTS

| | | | | |
|---|---|---|---|---|
| CN | 109322831 | A * | 2/2019 | |
| JP | 11107922 | A * | 4/1999 | F04D 1/06 |
| JP | 2014074359 | A | 4/2014 | |
| JP | 2015190320 | A * | 11/2015 | F04D 1/06 |
| JP | 2015190320 | A | 11/2015 | |
| WO | WO-2013143446 | A1 * | 10/2013 | F04D 29/0473 |
| WO | WO-2019097953 | A1 * | 5/2019 | F04B 39/12 |

* cited by examiner

MULTISTAGE PUMP

CROSS-REFERENCE TO RELATED APPLICATION

This application claims benefit of U.S. Provisional Application No. 62/941,370, filed Nov. 27, 2019, the contents of which are hereby incorporated herein by reference.

BACKGROUND

Field of the Invention

This invention generally relates to a multistage pump. In particular, the invention relates to a pipe for a multistage pump.

Background Information

Conventional multistage pumps or multistage double volute pumps generally include opposed impeller designs. The opposed impellers are disposed facing opposite directions in order to balance the axial thrust generated by the rotating element. Crossover passageways convey product from the discharge of the mid-stage impeller to the far side of the pump, and into the eye of the subsequent opposing stage impeller. In the conventional multistage pumps the crossover passageways are integrally formed with the with the pump casing, and are rectangular or trapezoidal in cross-section.

SUMMARY

It has been discovered that in the conventional multistage pumps, the length of the passageways combined with the small cross-sectional areas (low specific speeds in particular) provide difficulties at the foundries. These passageways can require special windows cut into the casting to enable cleaning and removal of sand inclusions, partial blockages, core wires and debris. The requirements for this cleaning process adds cost and time to the casting process. Moreover, if the passageways are not cleaned effectively, a partially obstructed passageway or poor surface quality, could have detrimental effects on the pump performance. To improve operation of multistage pumps a new crossover and/or a new crossunder pipe is desired.

In view of the state of the known technology, a first aspect of the present disclosure is to provide a multistage pump that includes a pump casing, a shaft, a first impeller, a second impeller, and a pipe. The shaft is rotatably disposed within the pump casing and has a longitudinal axis. The first impeller is disposed within the casing at a first position along the shaft. The second impeller is disposed within the casing at a second position and along the shaft. The pipe is detachably attached to the pump casing, and has an inlet and an outlet, the inlet disposed at the discharge of the first impeller and the outlet disposed at an eye of the second impeller, such that discharge from the first impeller can be conveyed to the eye of the second impeller.

A second aspect of the present invention is to provide the multistage pump of the first aspect, wherein the pipe is formed separately from the pump casing.

A third aspect of the present invention is to provide the multistage pump of the first aspect or the second aspect wherein the pipe is configured to be bolted to the pump casing.

A fourth aspect of the present invention is to provide the multistage pump of any of the first aspect through third aspect wherein the pipe has a generally circular internal cross-section.

A fifth aspect of the present invention is to provide the multistage pump of any of the first aspect through fourth aspect wherein the multistage pump has 11 stages.

A sixth aspect of the present invention is to provide the multistage pump of any of the first aspect through fifth aspect wherein the multistage pump has 4 stages.

A seventh aspect of the present invention is to provide the multistage pump of any of the first aspect through sixth aspect wherein the pipe is a crossover pipe and the multistage pump includes a crossunder pipe detachably attached to the pump casing.

An eighth aspect of the present invention is to provide the multistage pump of any of the first aspect through seventh aspect wherein the pipe is a crossunder pipe and the multistage pump includes a crossover pipe detachably attached to the pump casing.

A ninth aspect of the present invention is to provide the multistage pump of any of the first aspect through eighth aspect wherein the pipe is rotated away from the longitudinal axis.

A tenth aspect of the present invention is to provide a pipe for a multistage pump, comprising a first end having an inlet and configured to be detachably attached to a casing at a first position at the discharge of a first impeller disposed within the pump casing, and a second end having an outlet and configured to be detachably attached to the casing at a second position at an eye of the second impeller, such that discharge from the first impeller is capable of being conveyed through the pipe from the outlet of the first impeller to the eye of the second impeller.

An eleventh aspect of the present invention is to provide the pipe the of the tenth aspect wherein the pipe is configured to be formed separately from the casing.

A twelfth aspect of the present invention is to provide the pipe of the tenth aspect or eleventh aspect wherein the first and second ends of the pipe are configured to be bolted to the pump casing.

A thirteenth aspect of the present invention is to provide the pipe of any of the tenth aspect through twelfth aspect wherein the pipe has a generally circular internal cross-section.

A fourteenth aspect of the present invention is to provide the pipe of any of the tenth aspect through thirteenth aspect wherein the pipe is a crossover pipe.

A fifteenth aspect of the present invention is to provide the pipe of any of the tenth aspect through fourteenth aspect wherein the pipe is a crossunder pipe.

A sixteenth aspect of the present invention is to provide the pipe of any of the tenth aspect through fifteenth aspect wherein the pipe is configured to be rotated away from a longitudinal axis of the pump.

These aspects of the invention provide an improved crossover or crossunder pipe that have significant advantages over the conventional passageways. For example, embodiments of the present invention allows for a smaller cross section than that of a conventional crossover. This smaller cross section possible due to the intrinsic accuracy of the inner surfaces of a standard pipe, whilst the surfaces of an integrated crossover are subject to undulations and imperfections generally compensated by a larger nominal cross section. Further, embodiments of the present invention can reduce hydraulic losses. Reduction of hydraulic losses is generally based on the roughness of the internal surfaces of the pipe, and the roughness of the internal surfaces of the pipe of the present invention is significantly improved compared to the standard finishing.

Additionally, present invention can provide freedom in the positioning of volute end and dump end. The hydraulic design of a crossover is conditioned by manufacturing and weight needs that can be relaxed in case of an external pipe. For example, in the conventional passageways long crossover/crossunder channels must be close to the body of the casing for formation and mass optimization, which translates into highly curved passageways with associated hydraulic losses.

Further, the 3D generated hydraulics associated with the embodiment of the present invention can optimized and substantiated by Computational fluid dynamics (CFD).

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
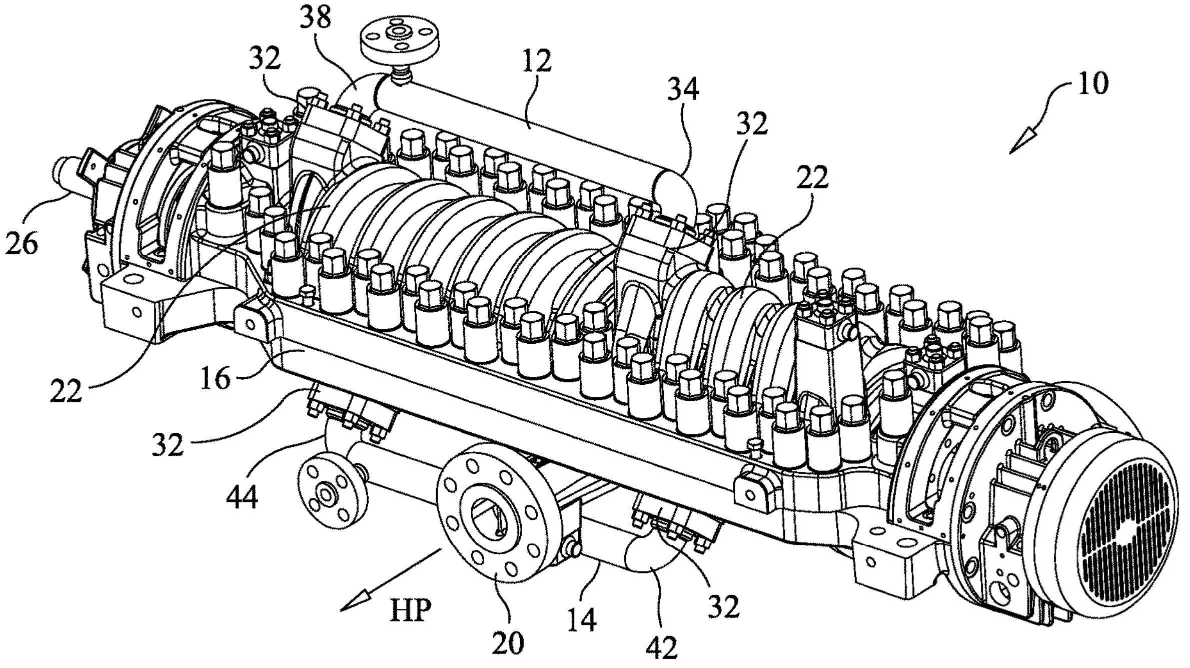
FIG. 1 is a top perspective view of one embodiment of a multistage pump that includes a pipe.
Figure 2:
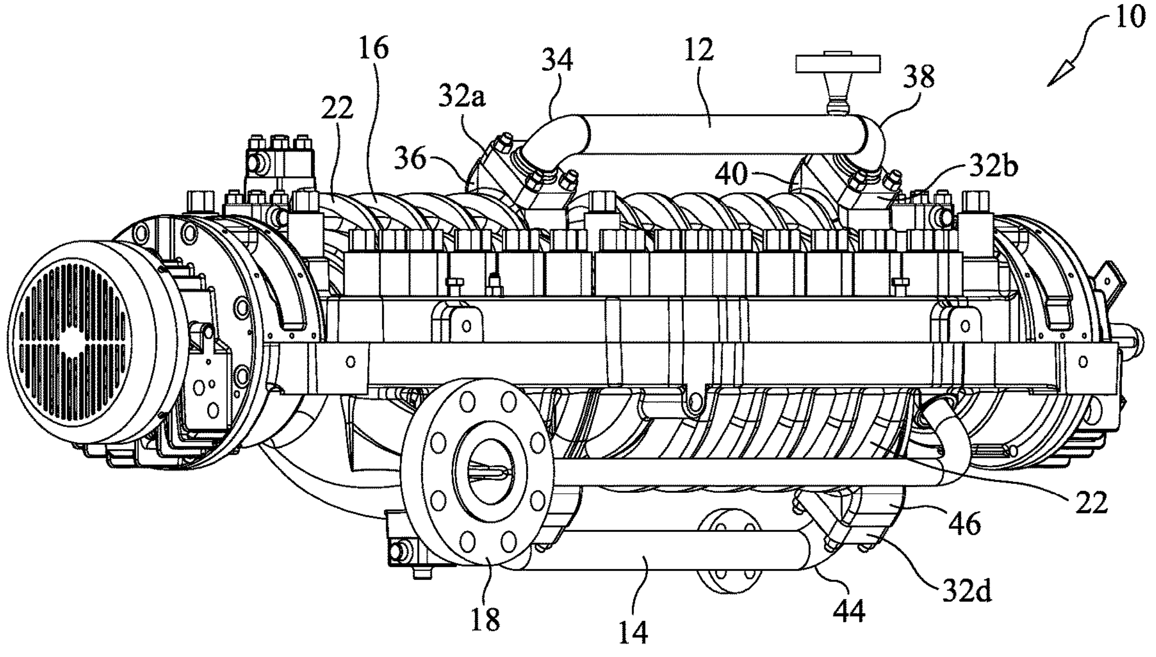
FIG. 2 is a front perspective view of the multistage pump of FIG. 1.
Figure 3:
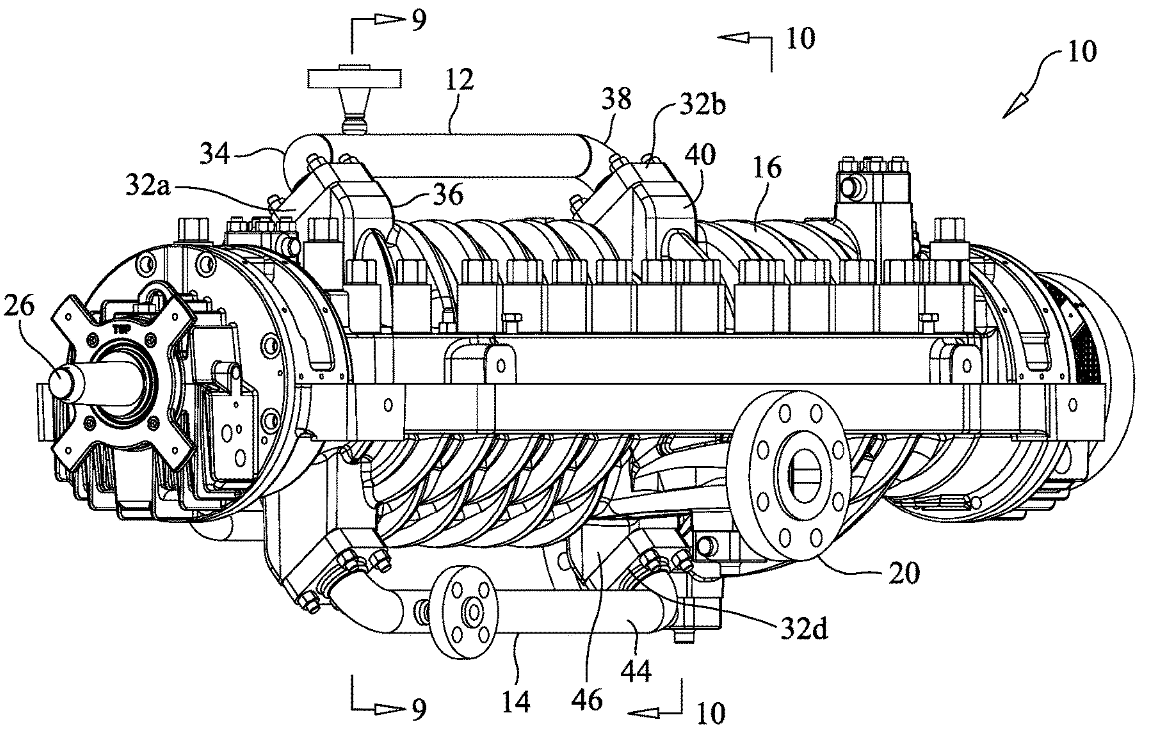
FIG. 3 is a rear perspective view of the multistage pump of FIG. 1.
Figure 4:
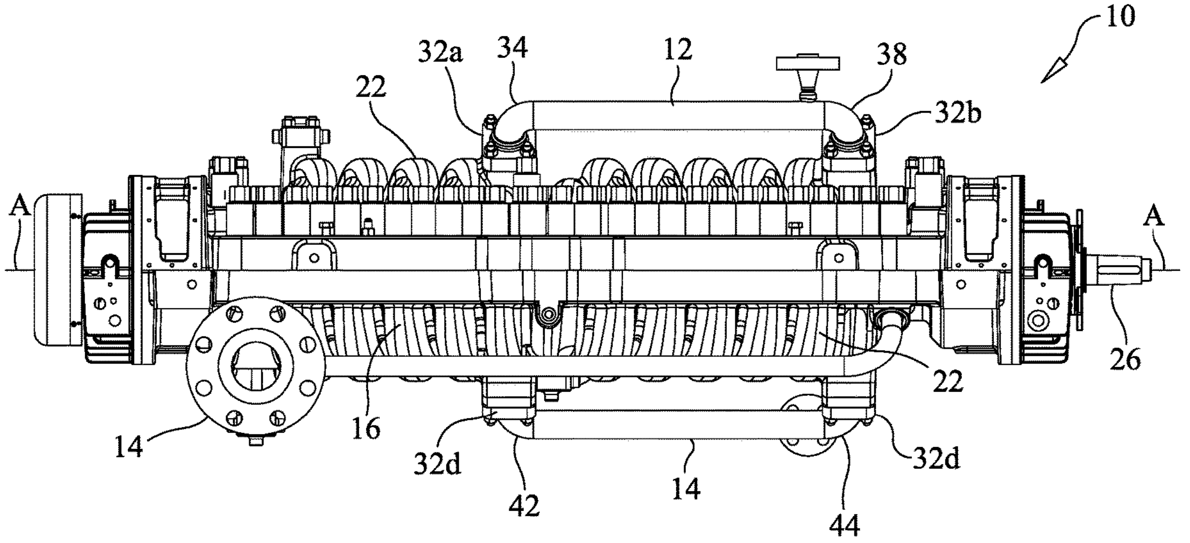
FIG. 4 is a left side view of the multistage pump of FIG. 1.
Figure 5:
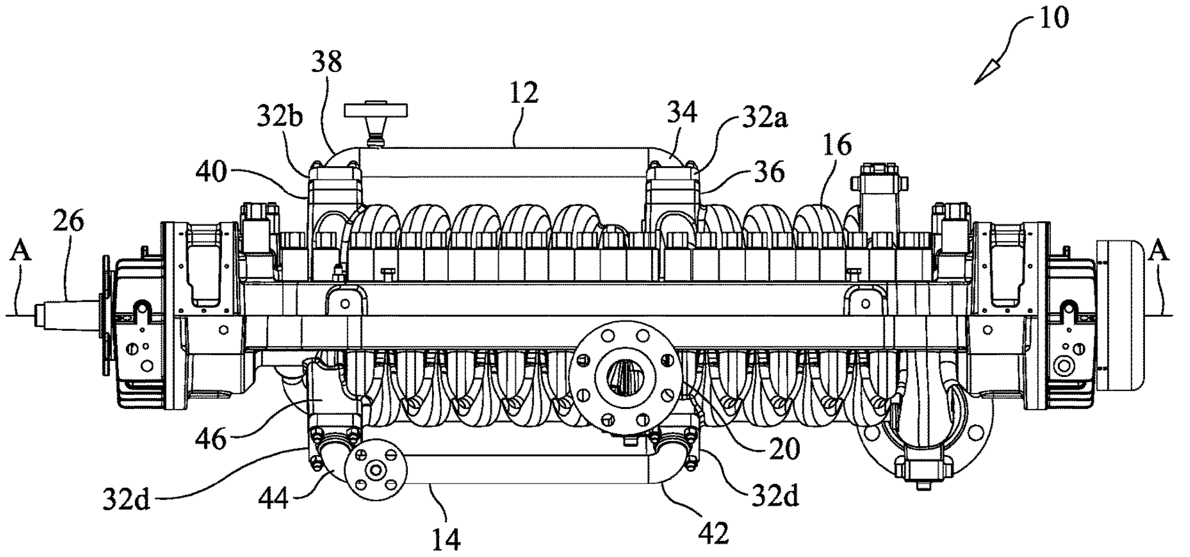
FIG. 5 is a right side view of the multistage pump of FIG. 1.
Figure 6:
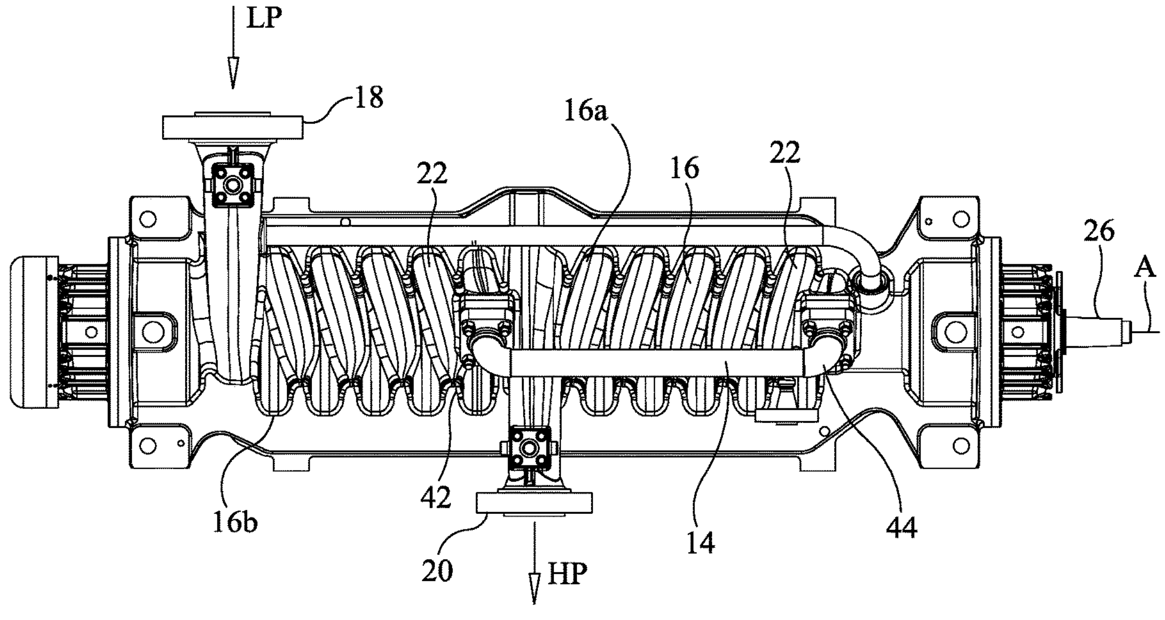
FIG. 6 is a bottom view of the multistage pump of FIG. 1.
Figure 7:
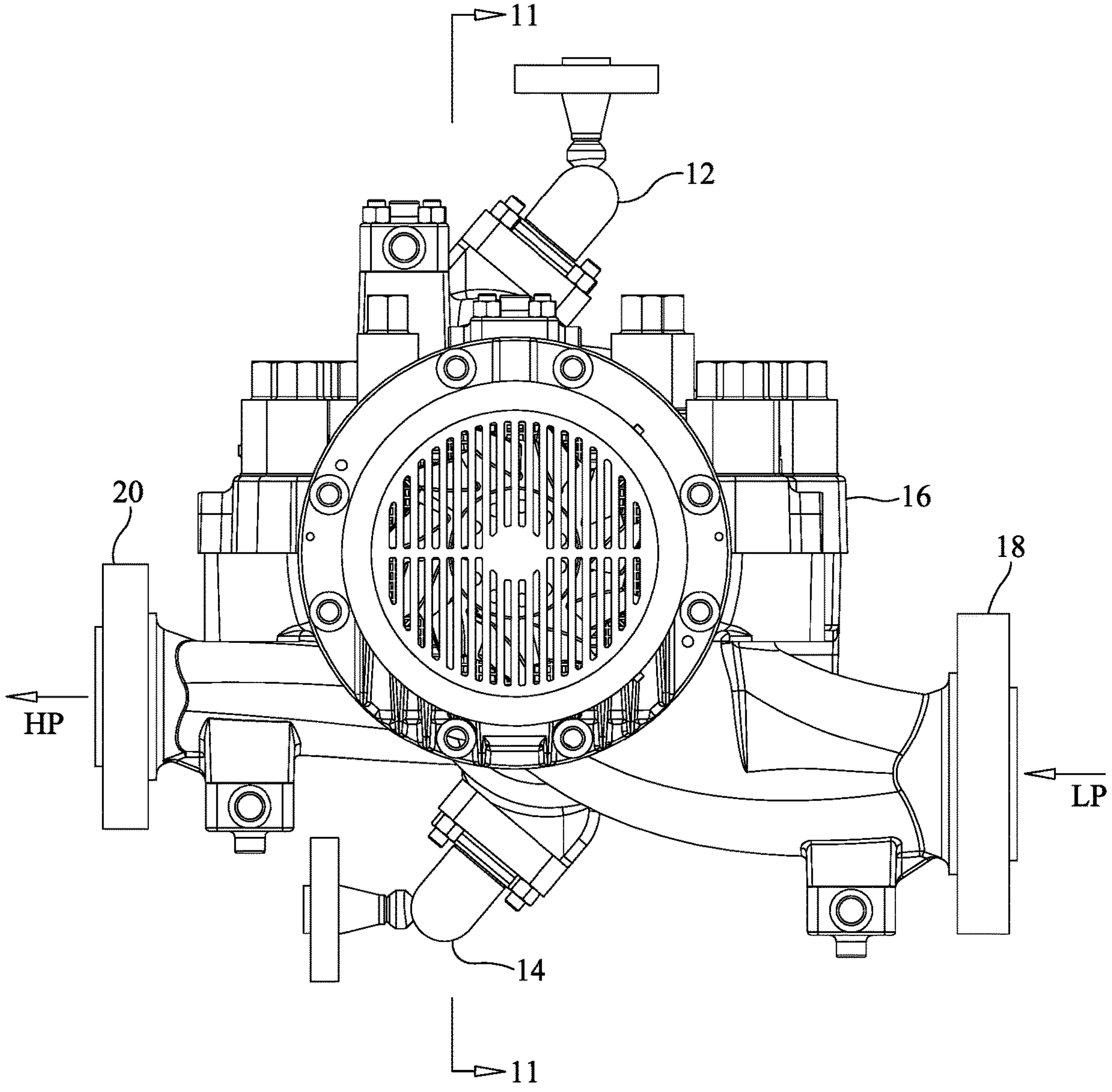
FIG. 7 is a front view of the multistage pump of FIG. 1.
Figure 8:
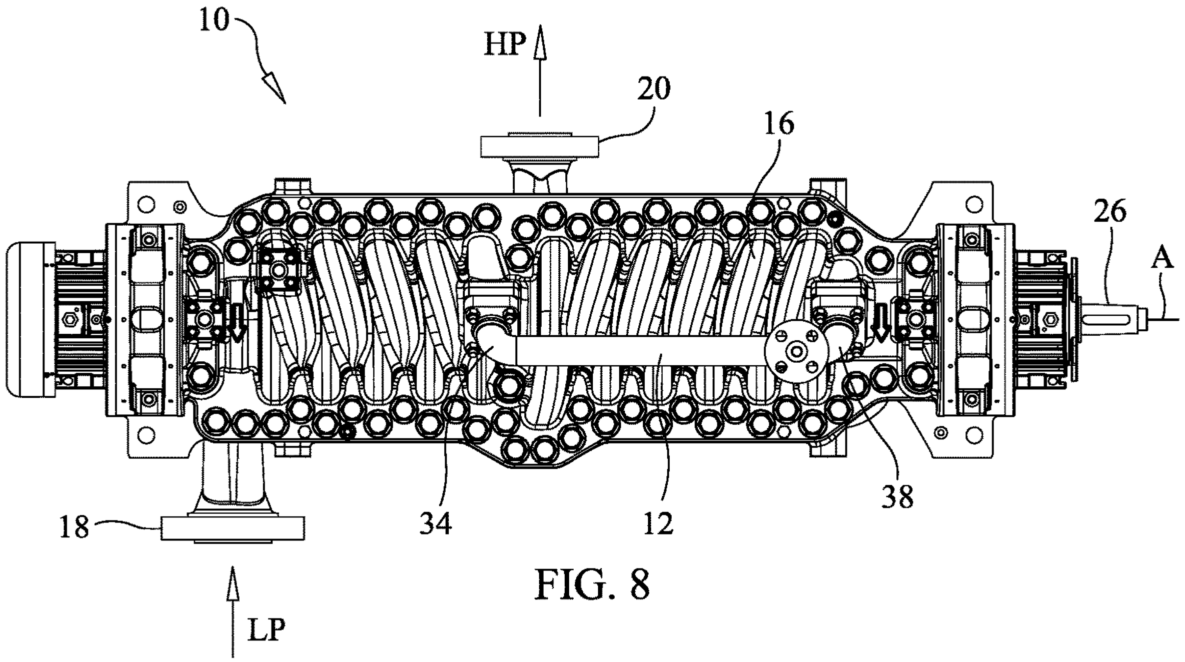
FIG. 8 is a top view of the multistage pump of FIG. 1.

Referring initially to FIG. 1, a multistage pump 10 that includes a cross over pipe 12 and a crossunder pipe 14 is illustrated in accordance with a first embodiment. In particular, the multistage pump 10 includes a cylindrical pump casing (or housing) 16, an impeller shaft, a first impeller 28, a second impeller 30, the crossover pipe 12 and the crossunder pipe 14.

The casing 16 includes a pump inlet 18 through which the multistage process fluid enters the pump at the low pressure side LP as indicated by the arrow, and a pump outlet 20 for discharging the process fluid with an increased pressure at the high pressure HP side as indicated by the arrow. Typically, the pump outlet 20 is connected to a pipe or a piping (not shown) for delivering the process fluid to another location. The pressure of the process fluid at the pump outlet 20, i.e. at the high pressure side HP, is typically considerably higher than the pressure of the process fluid at the pump inlet 18, i.e. at the low pressure side LP. A typical value for the difference between the high pressure HP and the low pressure LP side is for example about 50 bar to about 200 bar.

The casing 16 is a split "staged" casing 16 with several stage segments 22, which are able to withstand the pressure generated by the multistage pump 10 as well as the pressure exerted on the multistage pump 10 by the environment. The stage segments 22 comprise several different casing parts, which are connected to each other to form the casing 16. Whereby the several stage segments 22 can include a high pressure segment **16*a* disposed on the high pressure HP side at the pump outlet 20, a low pressure segment 16*b* disposed on the low pressure LP side at the pump inlet 18, and any number of segments desired. FIGS. 1-11 illustrate an embodiment with eleven (11) segments and FIGS. 12-23 illustrate an embodiment with four (4) segments; however, it is noted that there can be as many or as few segments as desired. The stage segments 22 are arranged in tandem and arranged between the low pressure segment 16*b* and the high pressure segment 16*a*. The low pressure segment 16*b* can be a suction casing and the high pressure segment 16*a*** can be a discharge casing.

The multistage pump 10 further includes a pump rotor rotating about an axial or longitudinal direction A in an operating state of the multistage pump 10. As can be understood, the pump rotor conveys the process fluid from an inlet annulus at the low pressure side LP to a discharge annulus at the high pressure side HP.

The pump rotor includes a shaft 26 rotatable about the axial direction A and a plurality of impellers (e.g., in one embodiment, first impeller 28 and second impeller 30) arranged in series along the axial direction A for conveying the process fluid from the inlet 18 to the outlet 20 and thereby increasing the pressure of the process fluid. The shaft 26 is rotatably disposed within the pump casing 16 and the first impeller 28 is disposed within the casing 16 at a first position along the shaft 26 and the second impeller 30 is disposed within the casing 16 at a second position and along the shaft 26.

A drive motor can be used to rotate the shaft 26 of the pump rotor. In some embodiments, the motor can be a separate unit located outside the casing 16 of the pump. In other embodiments, the motor can be integrated into the casing 16.

The crossover pipe 12 crosses over an upper side of the casing 16 and is detachably attached to the pump casing 16.

The cross over pipe 12 has an inlet 12*a* and an outlet 12*b*. The inlet 12*a* is disposed at the discharge of the first impeller 28 and the outlet 12*b* is disposed at an eye of the second impeller 30, such that discharge from the first impeller 28 can be conveyed to the eye of the second impeller 30. The cross over pipe 12 is formed separately from the pump casing 16, and configured to be bolted to the pump casing 16. In one embodiment, the pipe cross over pipe 12 is attached to the pump casing 16 using a block flange 32. The block flange 32 enables a reduction is size relative to a conventional flange, such that the flange size is not the dominant feature of the outer surface of the case. As can be understood, the casing is significantly lighter and easier to form and machine relative to traditional pipe flanges for bolting on pipes. Accordingly, the block flanges 32 are central to the compactness of the design of casing 16.

Figure 9:
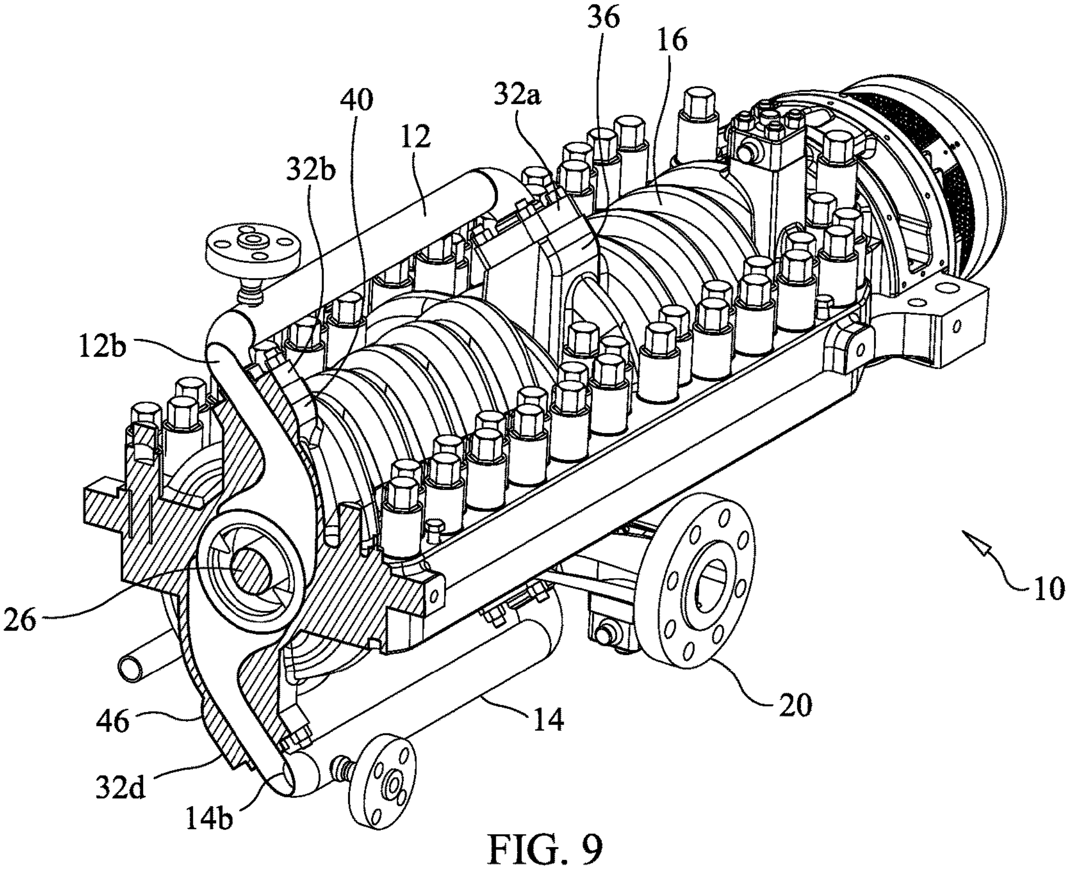
FIG. 9 is a cross sectional view taken along lines 9-9 of FIG. 3.
Figure 10:
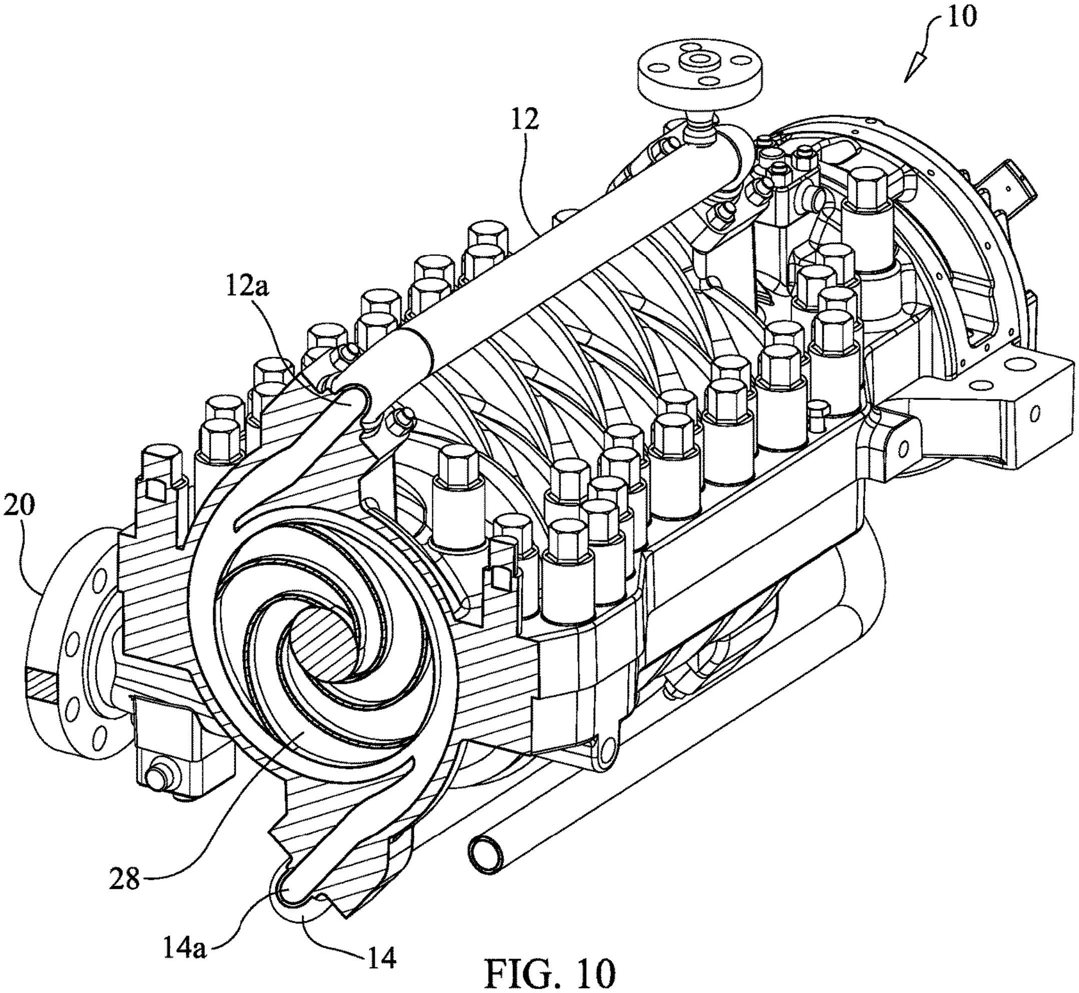
FIG. 10 is a cross sectional view taken along lines 10-10 of FIG. 3.
Figure 11:
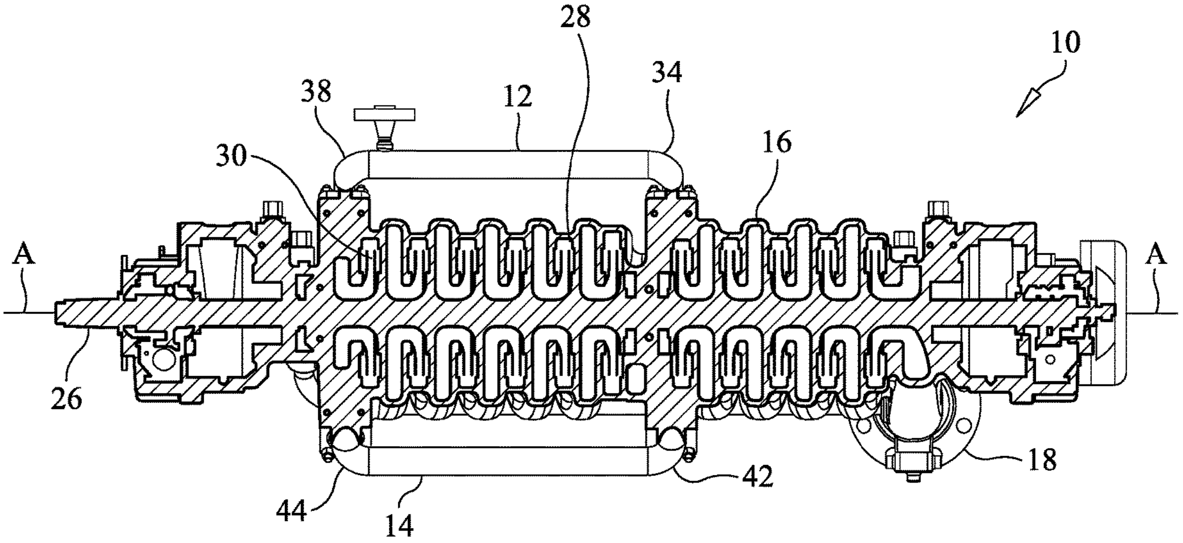
FIG. 11 is a cross sectional view taken along lines 11-11 of FIG. 7.
Figure 12:
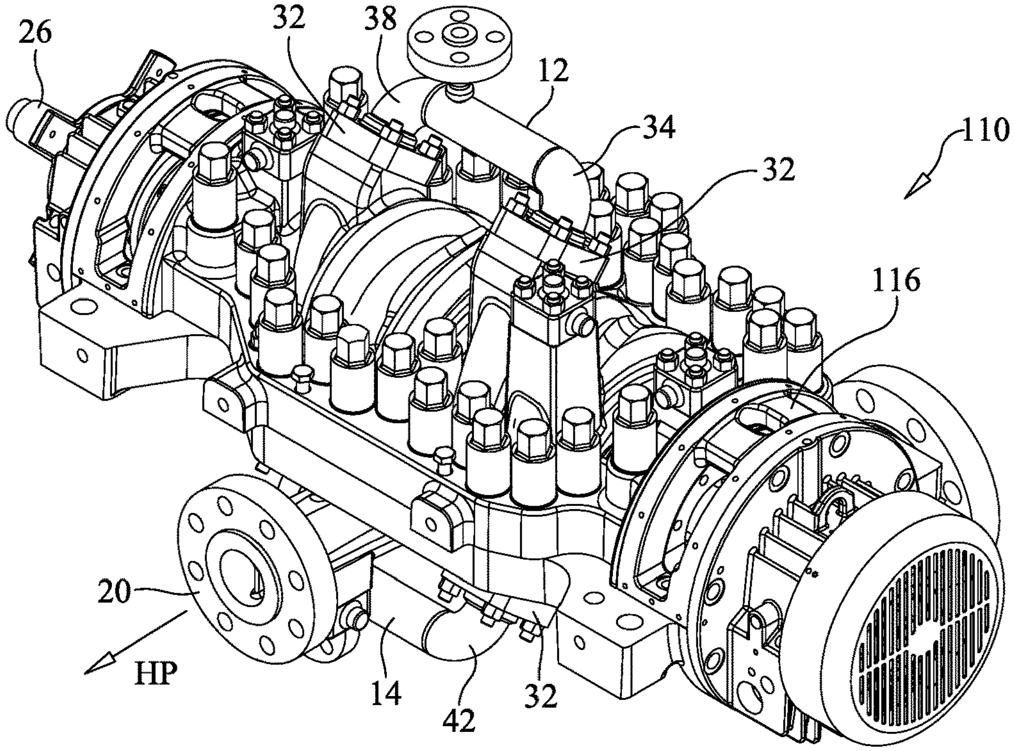
FIG. 12 is a top perspective view of a second embodiment of a multistage pump that includes a pipe.
Figure 13:
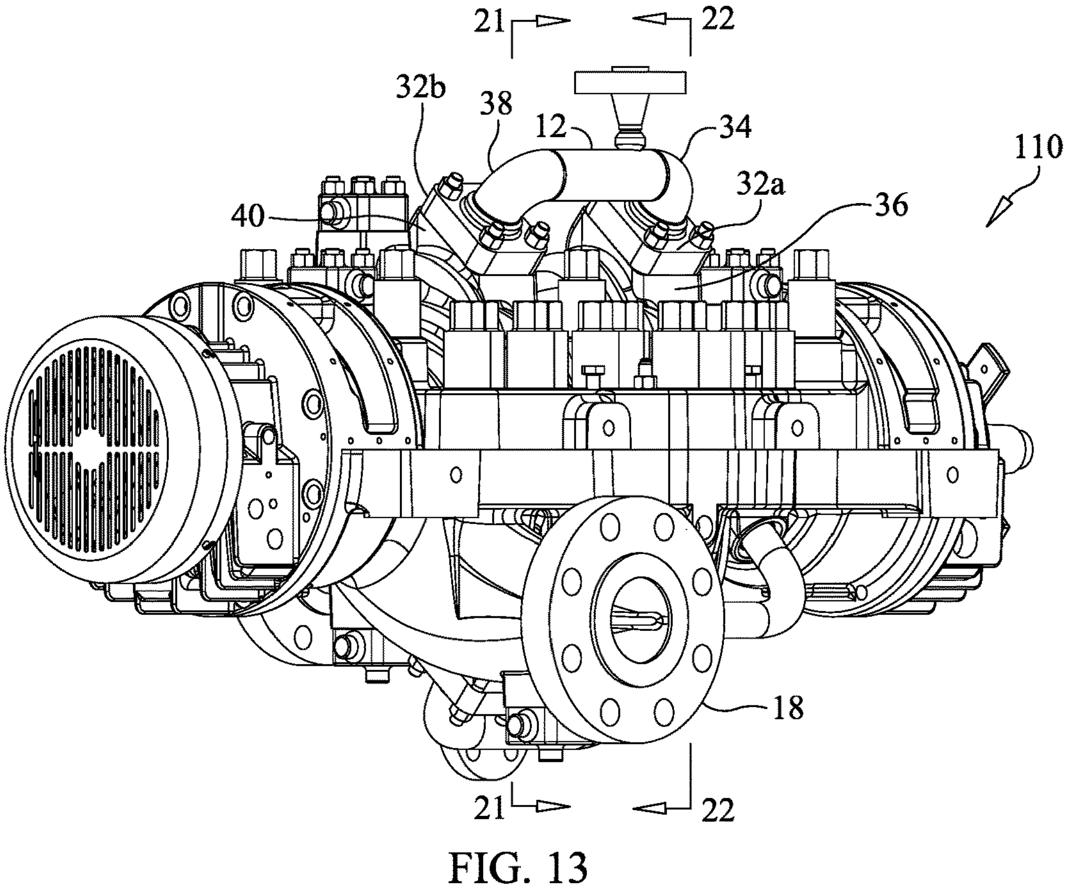
FIG. 13 is a front perspective view of the multistage pump of FIG. 12.
Figure 14:
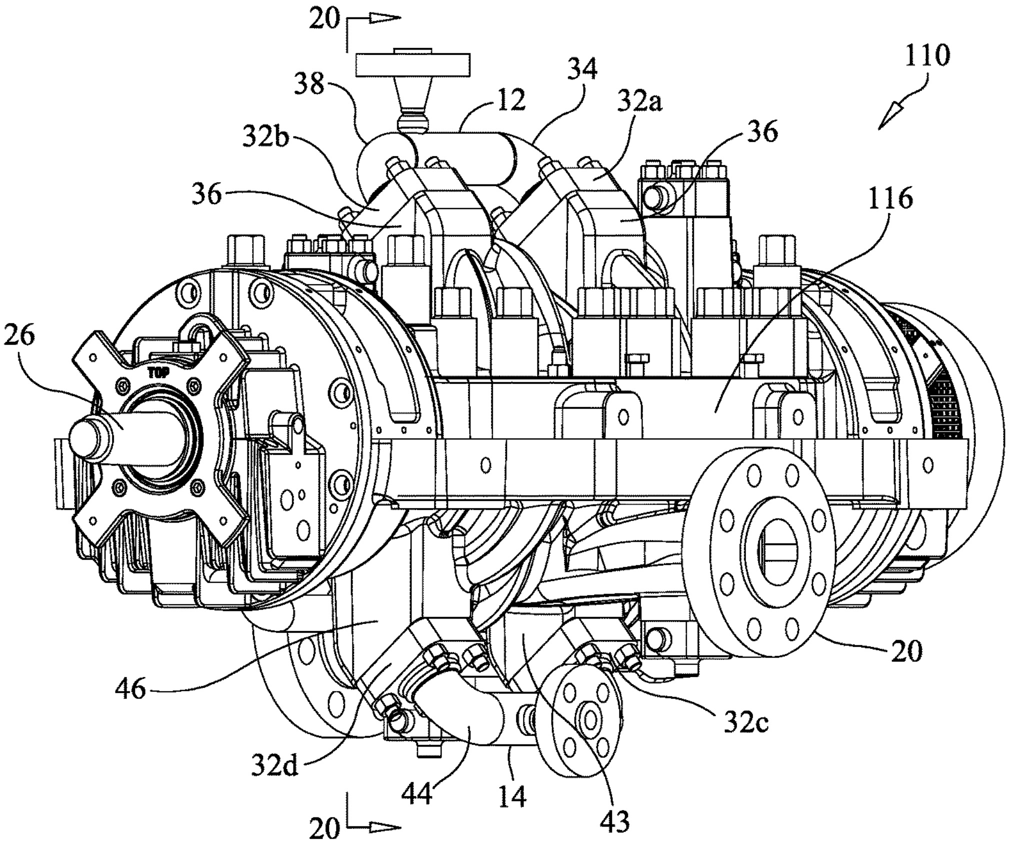
FIG. 14 is a rear perspective view of the multistage pump of FIG. 12.
Figure 15:
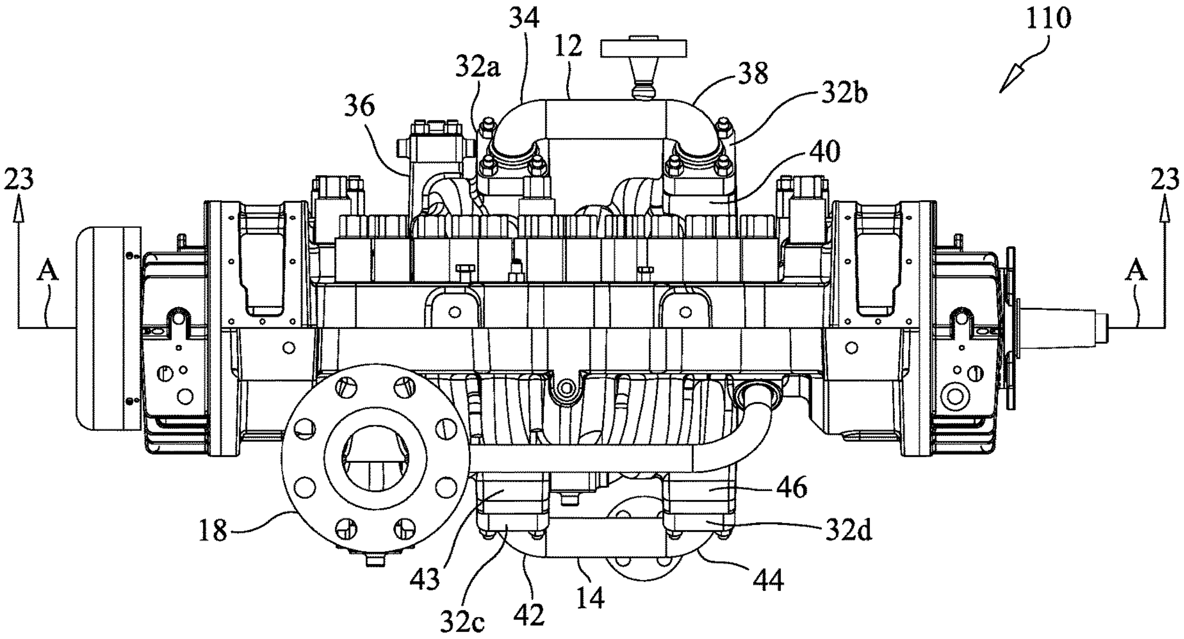
FIG. 15 is a left side view of the multistage pump of FIG. 12.
Figure 16:
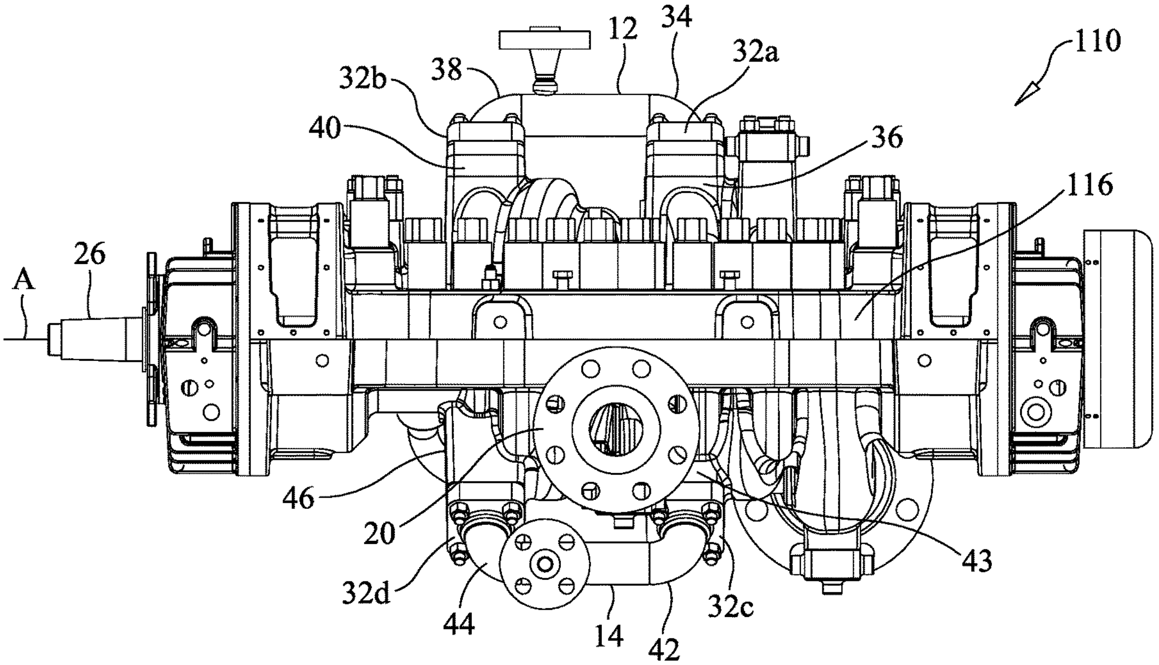
FIG. 16 is a right side view of the multistage pump of FIG. 12.
Figure 17:
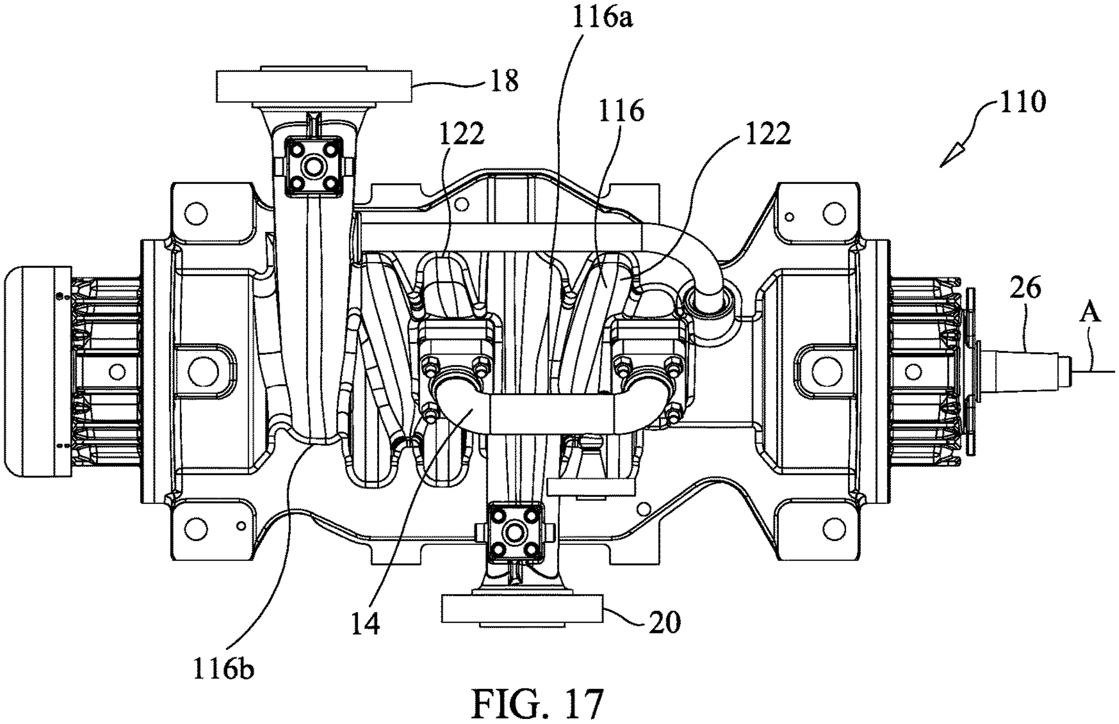
FIG. 17 is a bottom view of the multistage pump of FIG. 12.
Figure 18:
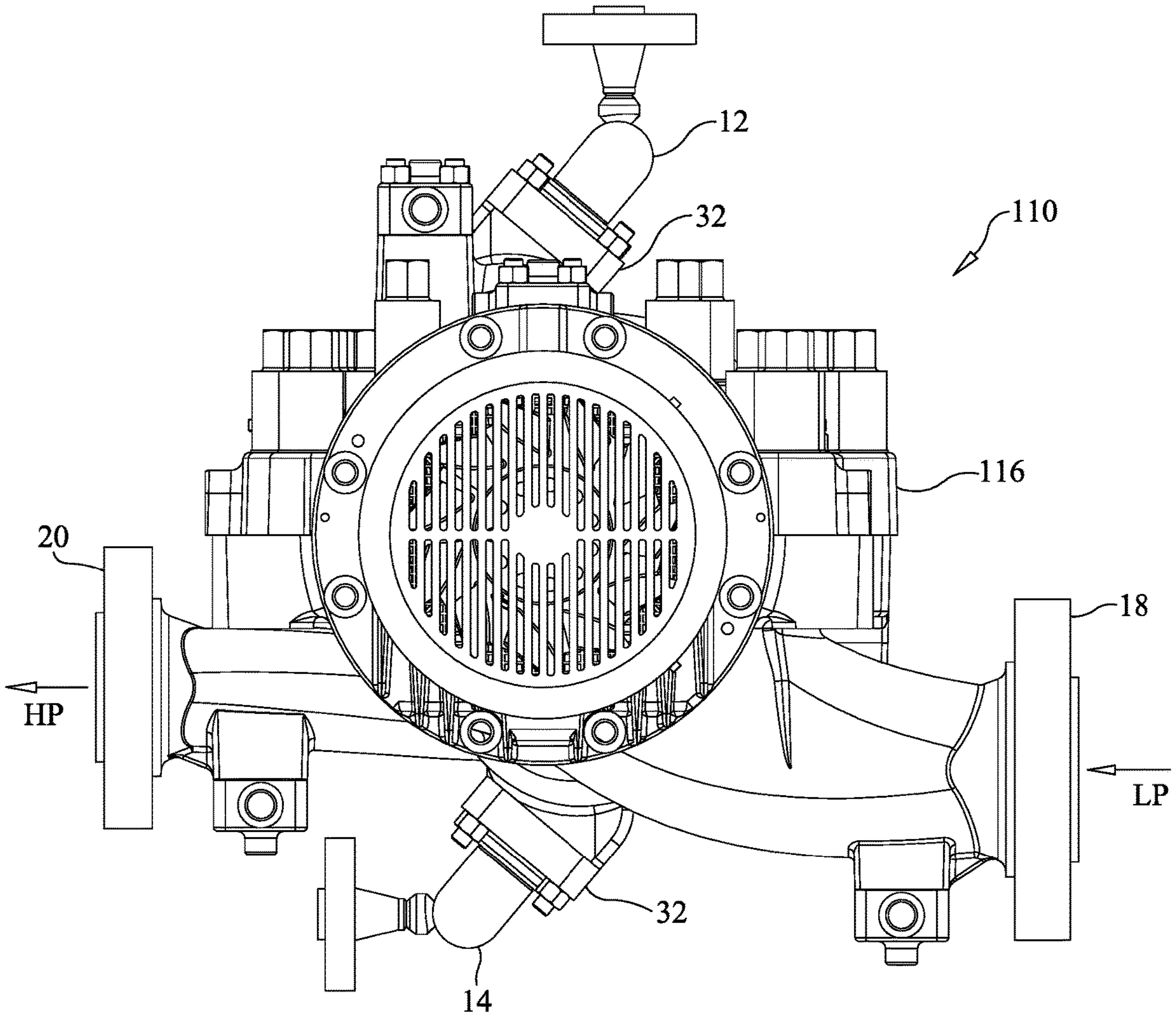
FIG. 18 is a front view of the multistage pump of FIG. 12.
Figure 19:
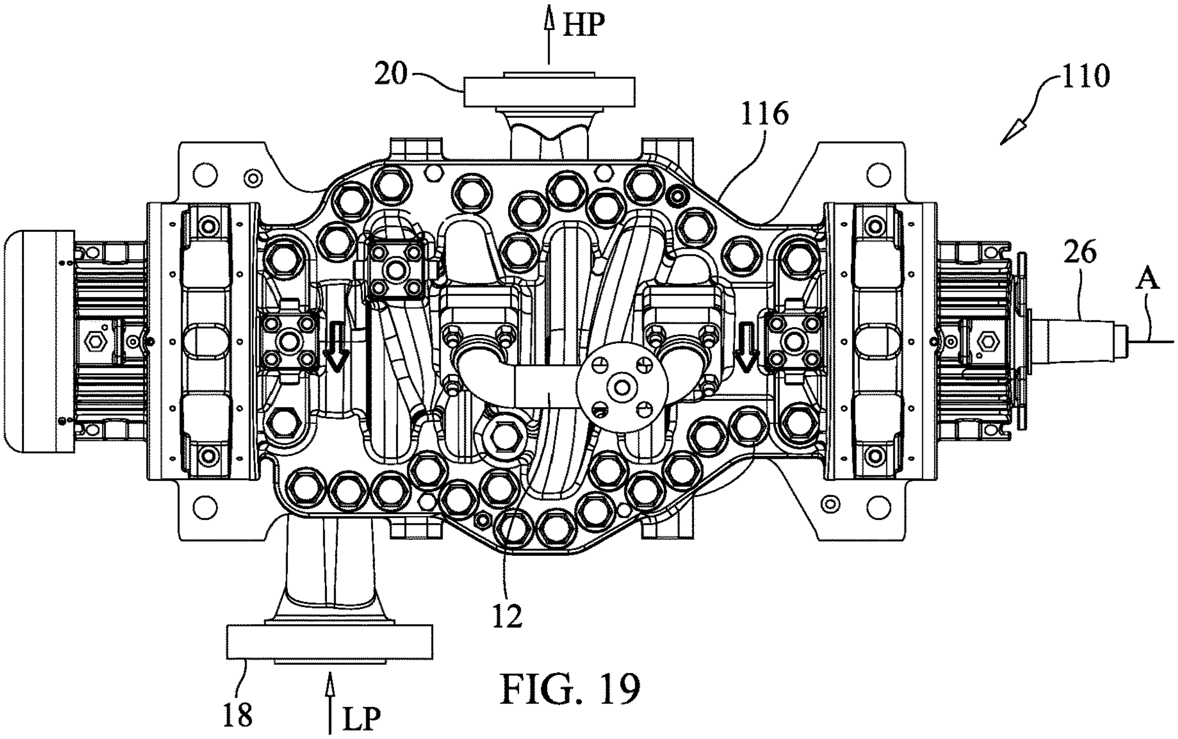
FIG. 19 is a top view of the multistage pump of FIG. 12.
Figure 20:
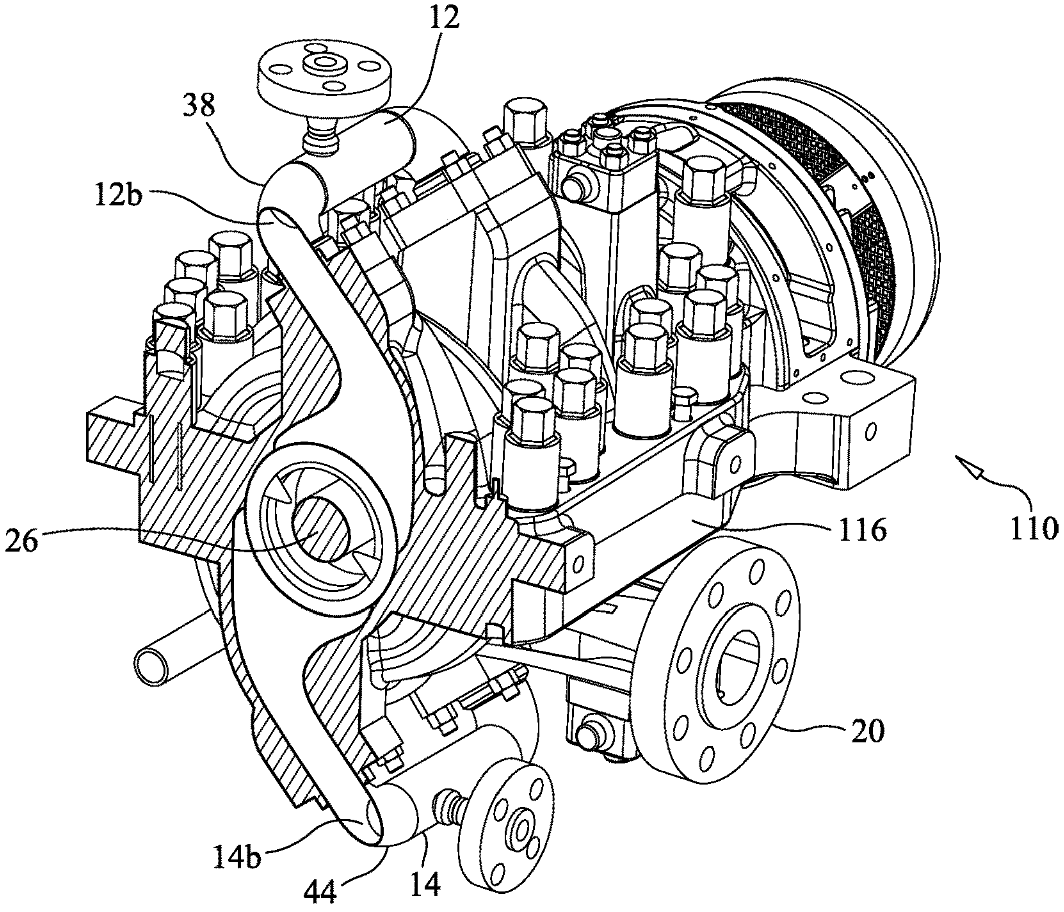
FIG. 20 is a cross sectional view taken along lines 20-20 of FIG. 14.
Figure 21:
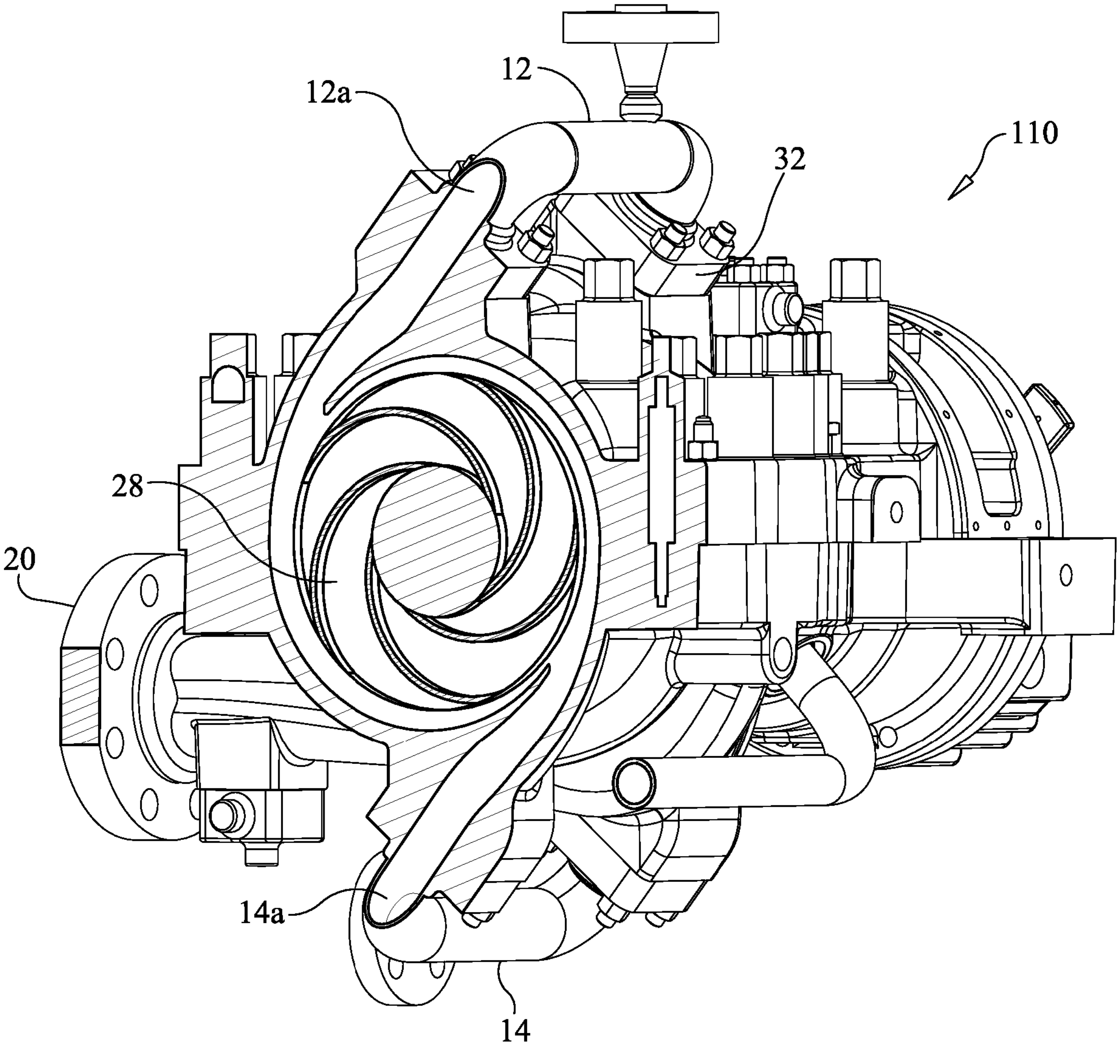
FIG. 21 is a cross sectional view taken along lines 21-21 of FIG. 13.
Figure 22:
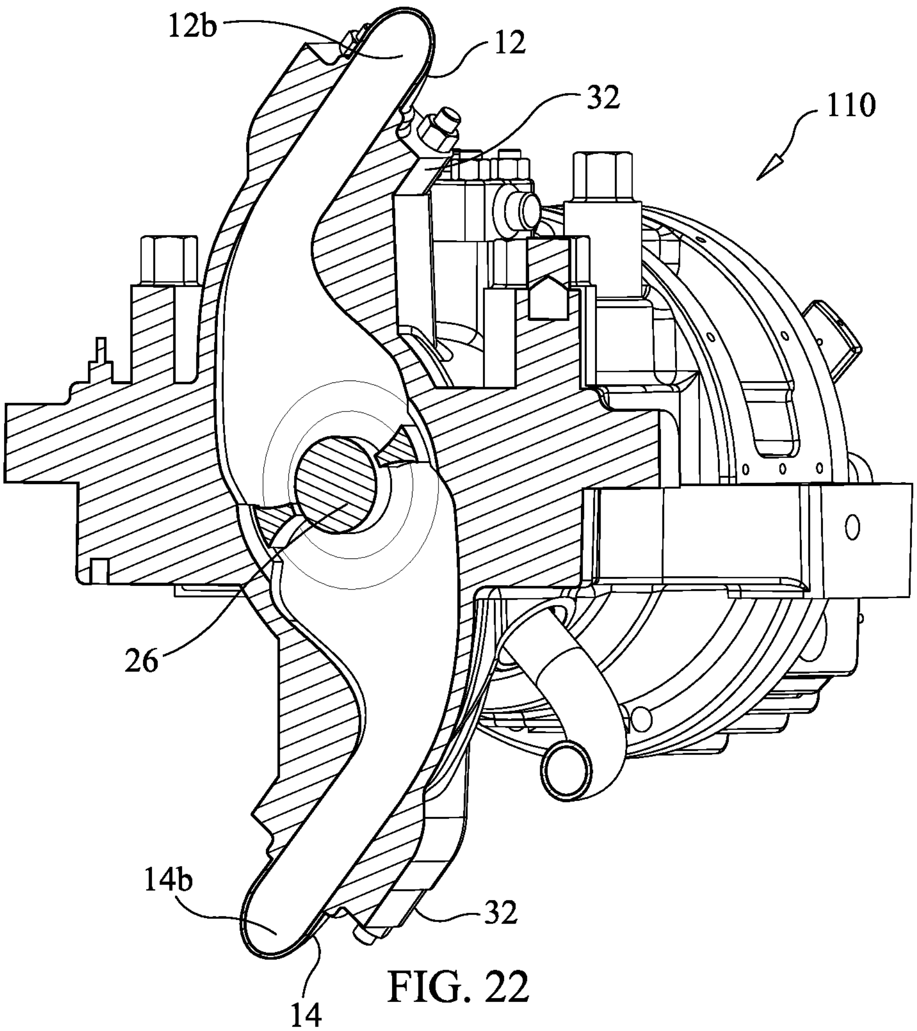
FIG. 22 is a cross sectional view taken along lines 22-22 of FIG. 13.
Figure 23:
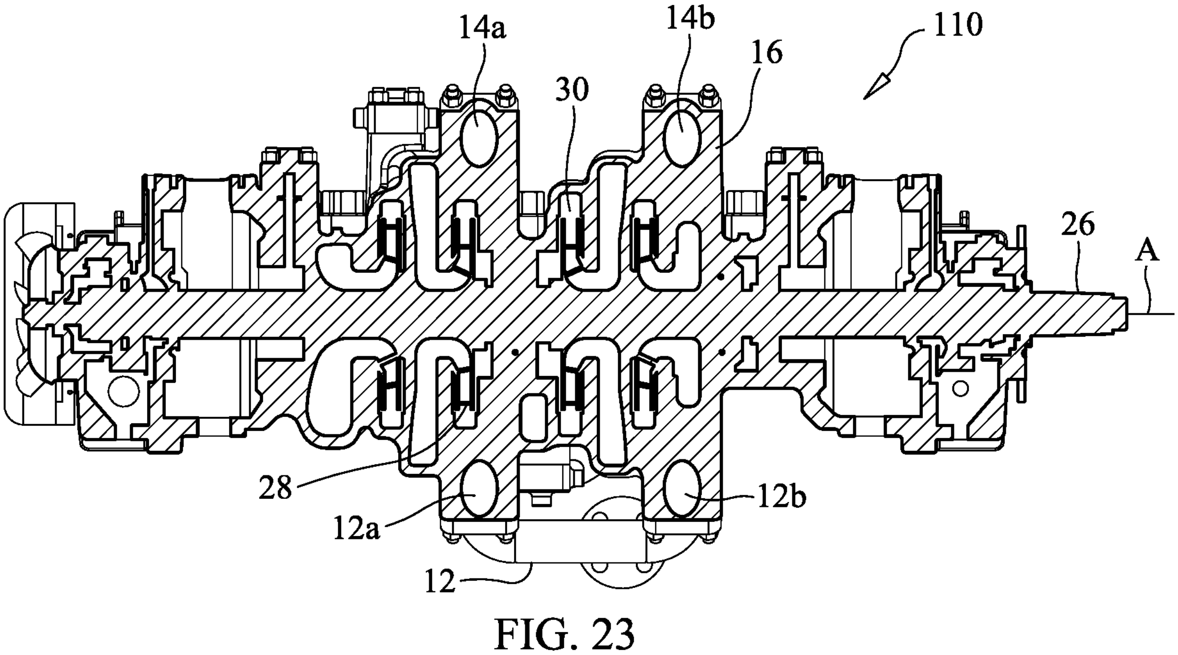
FIG. 23 is a cross section view taken along lines 23-23 of FIG. 15.

As shown in FIGS. 9 and 10, the cross over pipe 12 attaches to the casing at the first end 34 with a first block flange 32*a*. The first block flange 32*a* is a rectangular or square flange and is attached (or unitarily molded) to the first end 34 of the pipe 12. The block flange 32*a* is coupled to a corresponding block 36 molded into the casing 16 using bolts, or in any other suitable manner. The crossover pipe 12 is a generally tubular pipe that extends from the block flange 32*a* generally transverse to the longitudinal axis A of the casing 16. The pipe 12 then curves so as to extend along the casing 16 parallel (or substantially parallel) to the longitudinal direction A. The pipe 12 then curves inwardly toward the casing and extends in a direction generally transverse to the longitudinal axis A of the casing 16. The second end 38 of the pipe 12 attaches to the casing 16 at the second end 36 with a second block flange 32*b*. The second block flange 32*b* is a rectangular or square flange that is attached (or unitarily molded) to the second end 38 of the pipe 12. The second block flange 32*b* is coupled to a corresponding block 40 molded into the casing 16 using bolts, or in any other suitable manner. The cross over pipe 12 can have a generally circular internal cross-section, or any other suitable cross section. In one embodiment, the cross over pipe 12 is rotated away from the longitudinal axis.

The crossunder pipe 14 crosses under a lower side of the casing 16 and is detachably attached to the pump casing 16. The crossunder pipe 14 has an inlet 14*a* and an outlet 14*b*. The inlet 14*a* is disposed at the discharge of the first impeller 28 and the outlet 14*b* is disposed at an eye of the second impeller 30, such that discharge from the first impeller 28 can be conveyed to the eye of the second impeller 30. The crossunder pipe 14 is formed separately from the pump casing 16, and configured to be bolted to the pump casing 16. In one embodiment, the pipe crossunder pipe 14 is attached to the pump casing 16 using a block flange 32. The block flange 32 enables a reduction is size relative to a conventional flange, such that the flange size is not the dominant feature of the outer surface of the case. As can be understood, the casing 16 is significantly lighter and easier to form and machine relative to traditional pipe flanges for bolting on pipes. Accordingly, the block flanges 32 are central to the compactness of the design of casing 16.

As shown in FIGS. 9 and 10, the crossunder pipe 14 attaches to the casing 16 at the first end 42 with a first block flange 32*c*. The first block flange 32*c* is a rectangular or square flange is attached (or unitarily molded) to the first end 42 of the pipe 14. The block flange 32*c* is coupled to a corresponding block 44 molded into the casing 16 using bolts, or in any other suitable manner. The crossunder pipe 14 is a generally tubular pipe that extends from the block flange 32*c* generally transverse to the longitudinal axis A of the casing. The pipe 14 then curves so as to extend along the casing 16 parallel to the longitudinal direction A. The pipe 14 then curves inwardly toward the casing 16 and extends in a direction generally transverse to the longitudinal axis A of the casing 16. The second end 44 of the pipe 14 attaches to the casing 16 at the second end 44 with a second block flange 32*d*. The second block flange 32*d* is a rectangular or square flange that is attached (or unitarily molded) to the second end 44 of the pipe 14. The second block flange 32*d* is coupled to a corresponding block 46 molded into the casing using bolts, or in any other suitable manner. The crossunder pipe 14 can have a generally circular internal cross-section, or any other suitable cross section. In one embodiment, the crossunder pipe 14 is rotated away from the longitudinal axis.

As can be understood, the block flanges 32 disclosed herein are formed simultaneously with the pipes 12 and 14, such that the first and second block flanges are unitary with the pipe. However, if desired, the block flanges 32 can be separately formed from the pipes 12 and 14 and coupled thereto using any desired coupling. For example, the block flanges 32 can be coupled to the pipes 12 and 14 by welding, bolts or any other suitable connection. Additionally, the block flanges 32 are preferably formed from the same material as the pipes 12 and 14; however, the block flanges 32 can be formed from a different material.

It goes without saying that the multistage pump 10 according to the invention may be designed as a vertical or horizontal pump with the pump rotor extending in the vertical or horizontal direction respectively, i.e. perpendicular to the direction of gravity.

As can be understood, the fluid flow exits the pre-crossover (upstream) impeller (first impeller 28) and is split in two channels by the axial split volute case. One half of the total flow travels through the crossover and one half of the flow travels through the crossunder. That is one half of the flow enters the first end 34 of the crossover pipe 12 at the inlet 12*a* and one half of the flow enters the first end 42 of the crossover pipe 14 at the inlet 14*a*.

From there both flow halves from through the respective pipe (cross over pipe 12 and crossunder pipe 14) and exit the respective pipe at the respective second end (38 and 44) through the outlets (12*b* and 14*b*). The flows then enter the dump and get rerouted 180 deg and re-combined into a single flow path into the downstream impeller eye (the second impeller 30).

FIGS. 12-23 illustrate a second embodiment of a multistage pump 110 with four (4) segments. In this embodiment, like elements are referenced by the same reference numerals for the first embodiment, and are not further descried. In the second embodiment, the casing 116 is a split "staged" casing 116 with several stage segments 122, which are able to withstand the pressure generated by the multistage pump 10 as well as the pressure exerted on the multistage pump 10 by the environment. The stage segments 122 comprise several different casing parts, which are connected to each other to form the casing 116. Whereby the several stage segments 122 can include a high pressure segment 116*a* disposed on the high pressure HP side at the pump outlet 20, a low pressure segment 116*b* disposed on the low pressure LP side at the pump inlet 18. FIGS. 12-23 illustrate an embodiment with four (4) segments; however, it is noted that there can be as many or as few segments as desired. The stage segments 122 are arranged in tandem and arranged between the low pressure segment 116*b* and the high pressure segment 116*a*. The low pressure segment 116*b* can be a suction casing and the high pressure segment 116*a* can be a discharge casing.

The drive motor is conventional component that is well known in the art. Since the drive motor is are well known in the art, this structure will not be discussed or illustrated in detail herein. Rather, it will be apparent to those skilled in the art from this disclosure that the components can be any type of structure that can be used to carry out the present invention.

By providing a crossover pipe 12 and or a crossunder pipe 14, as described herein, the multistage pump 10 can have a small cross section, i.e., smaller dimensions than that of a conventional crossover. For example, the internal diameter crosssection can be up to about 50% of an internally formed passage. The smaller cross section is possible by the intrinsic accuracy of the inner surfaces of a standard pipe, whilst the surfaces of an integrated crossover are subject to undulations and imperfections generally compensated by a larger nominal cross section. The crossover and crossunder pipes 12 and 14 described herein can reduce hydraulic losses, since the roughness of internal surface of the pipe is significantly improved when compared to the standard finishing.

The crossover and crossunder pipes 12 and 14 described herein provide more freedom in the positioning of volute end and dump end. The hydraulic design of a classical crossover is conditioned by manufacturing and weight needs that can be relaxed for the crossover and crossunder pipes 12 and 14 described herein. As can be understood, conventional long crossover/crossunder channels must be close to the body of the casing 16 for formation and mass optimization, which translates into highly curved passageways with associated hydraulic losses. The present invention overcomes such issues.

The present invention also can optimize and sustain the 3D generated hydraulics associated by Computational fluid dynamics (CFD). The present invention can simplify case pattern set-up, since there is no need of the long crossover/crossunder coreboxes. The present invention, in some embodiments can use commercially available pipe and fittings, and use of compact custom block (attachment) flanges, to minimize the interface area with the casing 16.

Further, in the present invention, the developed length of pipe 12 and 14 can be adjusted to mitigate any potential issues with acoustic resonance, and the bolted attachment to the casing 16 compared a welded joint eliminates issues with stressed & improper welds, heat treatment, and requirements for non-destructive testing.

Also, crossover/crossunder pipes 12 and 14 described herein can rotated away from the vertical centerline, which reduces the overall height of the casing 16, thereby creating a more compact design.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A multistage pump, comprising:
- a pump casing including first and second blocks molded with the pump casing;
- a shaft rotatably disposed within the pump casing and having a longitudinal axis;
- a first impeller disposed within the pump casing at a first position along the shaft;
- a second impeller disposed within the pump casing at a second position and along the shaft; and
- a pipe including a first block flange and a second block flange, the first and second block flanges having a shape that corresponds to the first and second blocks, respectively, the pipe detachably attached to the pump casing via attachment of the first block flange to the first block and the second block flange to the second block, and the pipe having an inlet at a first end, an outlet at a second end and a portion extending between the first end and the second end, the portion extending parallel to the longitudinal axis of the pump casing, the inlet disposed at the discharge of the first impeller and the outlet disposed at an eye of the second impeller, such that discharge from the first impeller can be conveyed to the eye of the second impeller, the first end of the pipe forming an angle greater than zero with respect to a radial line extending from a center of the pump through a center of the block flange attached to the pipe, and the block flange having a surface that forms an angle other than 90 degrees with respect to the radial line extending from the center of the pump through the center of the block flange attached to the pipe.

2. The multistage pump of claim 1, wherein
the pipe is formed separately from the pump casing.

3. The multistage pump of claim 1, wherein
the pipe is configured to be bolted to the pump casing by the block flange.

4. The multistage pump of claim 1, wherein
the pipe has a generally circular internal cross-section.

5. The multistage pump of claim 1, wherein
the multistage pump has 11 stages.

6. The multistage pump of claim 1, wherein the multistage pump has 4 stages.

7. The multistage pump of claim 1, wherein the pipe is a crossover pipe and the multistage pump includes a crossunder pipe detachably attached to the pump casing.

8. The multistage pump of claim 1, wherein the pipe is a crossunder pipe and the multistage pump includes a crossover pipe detachably attached to the pump casing.

9. The multistage pump of claim 1, wherein the second end of the pipe forms an angle greater than zero with respect to the radial line extending from the center of the pump through the center of the block flange attached to the pipe.

10. The multistage pump of claim 9, wherein the second end of the pipe extends in a same plane as the first end of the pipe.

11. A pipe for a multistage pump, comprising:

a first end having an inlet and a first block flange, the pipe configured to be detachably attached to a pump casing via attachment of the first block flange to a correspondingly shaped first block molded to the pump casing at a first position at a discharge of a first impeller disposed within the pump casing;

a second end having an outlet and a second block flange, and configured to be detachably attached to the pump casing via attachment of the second block flange to a correspondingly shaped second block molded to the pump casing at a second position at an eye of a second impeller, such that discharge from the first impeller is capable of being conveyed through the pipe from an outlet of the first impeller to the eye of the second impeller; and a portion extending between the first end and the second end, the portion extending parallel to the longitudinal axis of the pump casing, the first end of the pipe forming an angle greater than zero with respect to a radial line extending from a center of the pump through the center of the block flange attached to the pipe, and the block flange having a surface that forms an angle other than 90 degrees with respect to the radial line extending from the center of the pump through the center of the block flange attached to the pipe.

12. The pipe of claim 11, wherein the pipe is configured to be formed separately from the pump casing.

13. The pipe of claim 11, wherein the first and second ends of the pipe are configured to be bolted to the pump casing.

14. The pipe of claim 11, wherein the pipe has a generally circular internal cross-section.

15. The pipe of claim 11, wherein the pipe is a crossover pipe.

16. The pipe of claim 11, wherein the pipe is a crossunder pipe.

17. The pipe of claim 11, wherein the second end of the pipe forms an angle greater than zero with respect to the radial line extending from the center of the pump through the center of the block flange attached to the pipe.

18. The multistage pump of claim 17, wherein the second end of the pipe extends in a same plane as the first end of the pipe.

* * * * *